US009449405B2

(12) United States Patent
Krueger

(10) Patent No.: US 9,449,405 B2
(45) Date of Patent: Sep. 20, 2016

(54) SYSTEMS AND METHODS TO DISPLAY DEPENDENCIES WITHIN A GRAPH OF GROUPED ELEMENTS

(75) Inventor: Uwe Krueger, Karlsruhe (DE)

(73) Assignee: SAP SE, Walldorf (DE)

( * ) Notice: Subject to any disclaimer, the term of this patent is extended or adjusted under 35 U.S.C. 154(b) by 448 days.

(21) Appl. No.: 12/956,695

(22) Filed: Nov. 30, 2010

(65) Prior Publication Data
US 2012/0137240 A1 May 31, 2012

(51) Int. Cl.
G06T 11/20 (2006.01)
G06F 9/44 (2006.01)
G06F 3/048 (2013.01)

(52) U.S. Cl.
CPC .............. *G06T 11/206* (2013.01); *G06F 8/75* (2013.01); *G06F 3/048* (2013.01)

(58) Field of Classification Search
CPC ........ G06F 8/34; G06F 8/10; G06F 11/3495; G06F 8/75; G06F 3/048; H04Q 3/0083; G06T 11/206
USPC ......... 715/771, 734, 738, 764, 853; 717/144
See application file for complete search history.

(56) References Cited

U.S. PATENT DOCUMENTS

| 7,055,130 B2* | 5/2006 | Charisius ................... G06F 8/20 717/108 |
| 7,647,563 B2* | 1/2010 | Guido ............... G06F 17/30994 715/851 |
| 2003/0138765 A1* | 7/2003 | Bowers ......................... 434/322 |
| 2005/0216923 A1* | 9/2005 | Krebs ............................ 719/331 |
| 2006/0010372 A1* | 1/2006 | Kaler et al. .................... 715/513 |
| 2006/0080594 A1* | 4/2006 | Chavoustie et al. .......... 715/503 |
| 2007/0234276 A1* | 10/2007 | Ottoni et al. .................. 717/104 |
| 2008/0040704 A1* | 2/2008 | Khodabandehloo et al. 717/105 |
| 2009/0138862 A1* | 5/2009 | Tanabe et al. ................ 717/149 |
| 2009/0326911 A1* | 12/2009 | Menezes et al. .................. 704/2 |
| 2010/0079462 A1* | 4/2010 | Breeds et al. ................ 345/440 |
| 2010/0242027 A1* | 9/2010 | Duplessis et al. ............ 717/128 |
| 2011/0060704 A1* | 3/2011 | Rubin et al. .................... 706/12 |
| 2012/0054714 A1* | 3/2012 | Novak et al. ................. 717/105 |

OTHER PUBLICATIONS

"Sotograph Functions: Special Visualizations", Software Tomograph, Jan. 2010, Retrieved date Nov. 30, 2010, download from http://www.software-tomography.ch/html/visualize.html, 2pgs.

* cited by examiner

Primary Examiner — Doon Chow
Assistant Examiner — Christopher J Fibbi
(74) Attorney, Agent, or Firm — Buckley, Maschoff & Talwalkar LLC

(57) ABSTRACT

According to some embodiments, for a set of elements a plurality of dependencies between source elements and target elements may be determined. It may also be determined that a first subset of elements are associated with a first group and that a second subset of the elements are associated with a second group. A first grouping shape, representing the first group, may be displayed on a user interface along with a second grouping shape representing the second group. Moreover, within the second grouping shape indications of the second subset of elements may be displayed. A dependency line may be displayed between the first grouping shape and the second grouping shape based on a dependency between a particular element in first subset and a particular element in the second subset, and the dependency line may intersect the second grouping shape at an intersection point. A dependency line may also be displayed from the intersection point to the indication representing the particular element in the second subset.

18 Claims, 6 Drawing Sheets

SYSTEMS AND METHODS TO DISPLAY DEPENDENCIES WITHIN A GRAPH OF GROUPED ELEMENTS

FIELD

Some embodiments relate to computer generated displays of grouped elements. More specifically, some embodiments are associated with systems and methods for displaying dependencies within a graph of grouped elements.

BACKGROUND

A display might provide information about a number of related elements to a user. For example, commonly used software development scenarios may combine different kind of relationships among elements, such as development objects. First of all, there may be dependencies among the objects. Secondly, the objects might be combined into one or more grouping levels to make the display and understanding of the elements achieve more manageable. By way of example, in Java there are methods that call other methods (and thus depend on them). Moreover, the methods may be bundled by classes that are aggregated into jars belonging to different development projects.

In many cases, the grouping of elements may occur as a result of logical organizational aspects that may not be particularly aligned with the technical basic dependencies among the grouped elements. One problem that arises is how to visualize and/or analyze the dependencies between the various grouping levels. Often, the structures and elements are not planned in advance, and must instead be manually aligned later on as a result of new requirements. It can be difficult to visualize the dependencies and consider "what-if" scenarios simulating structural re-organizations of the elements and groups. This may be particular true, for example, when there are hundreds of thousands of element and associated dependencies between them.

Accordingly, systems and methods to automatically and efficiently visualize element, groups, and/or dependencies may be provided in association with some embodiments described herein.

DETAILED DESCRIPTION

A display, such as a User Interface (UI) displayed on a computer monitor, may provide information about a number of related elements to a user. For example, commonly used software development scenarios may combine two different kinds of relationships among elements, such as development objects. First of all, there may be dependencies among the objects. Secondly, the objects might be combined into one or more grouping levels to make the display and understanding of the elements achieve more manageable. By way of example, in Java there are methods that call other methods (and thus depend on them). Moreover, the methods may be bundled by classes that are aggregated into jars belonging to different development projects.

Figure 1:
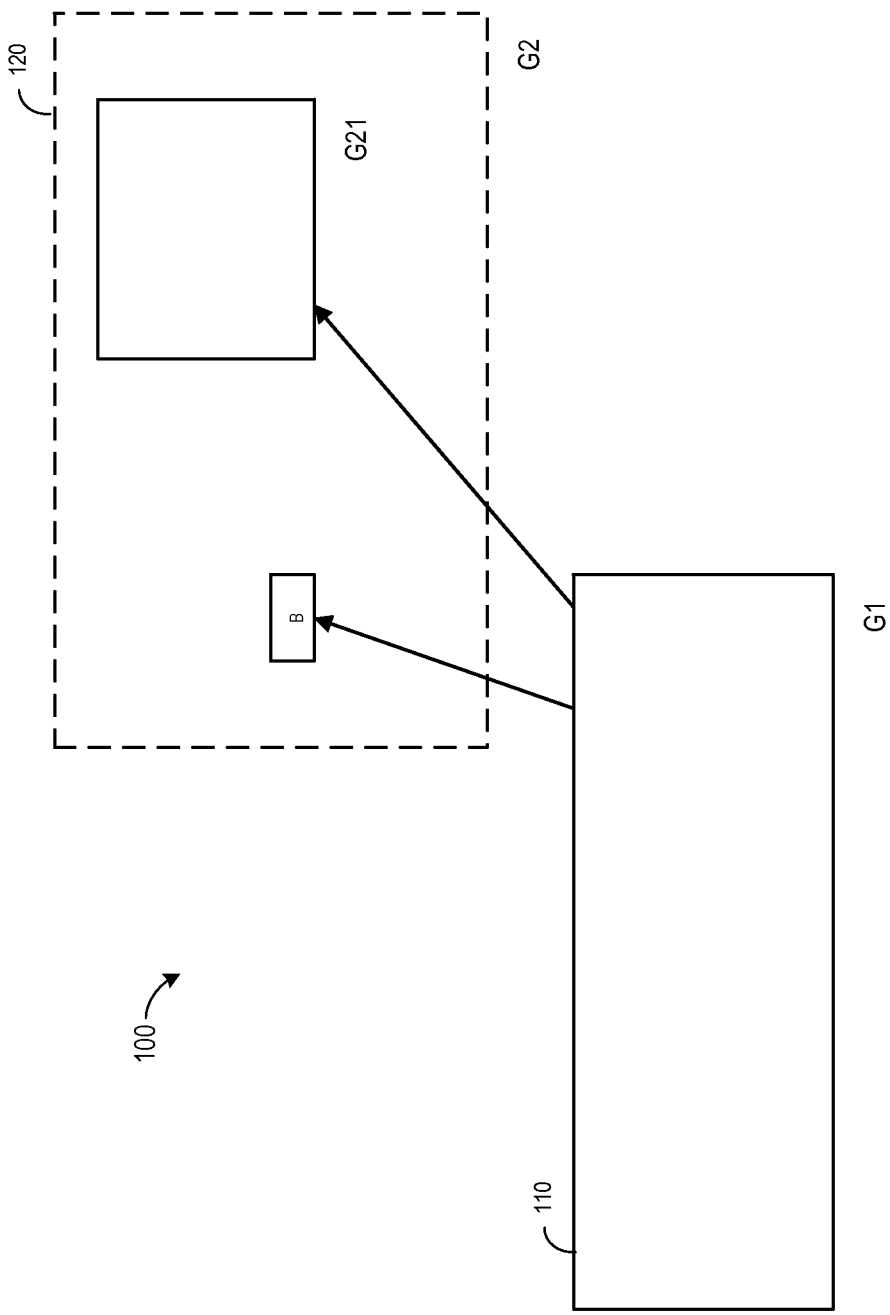
FIG. 1 is an illustration of a dependency graph display.

FIG. 1 is an illustration of a dependency graph display 100. In this example, two groups of elements G1 and G2 are represented by a first grouping rectangle 110 and a second grouping rectangle 120. Moreover, individual elements within the second grouping rectangle 120 are displayed: element B and sub-group G21. Further assume that both elements of group G2 have a dependency relationship with one or more elements within group G1. One way of visualizing these dependencies would be by drawing arrows between group G1 and the elements of group G2. Such an approach, however, can be impractical when there are a substantially large number of elements and associated dependencies. Consider, for example, what FIG. 1 would look like if groups G1 and G2 each had hundreds of elements and dependencies.

Figure 2:
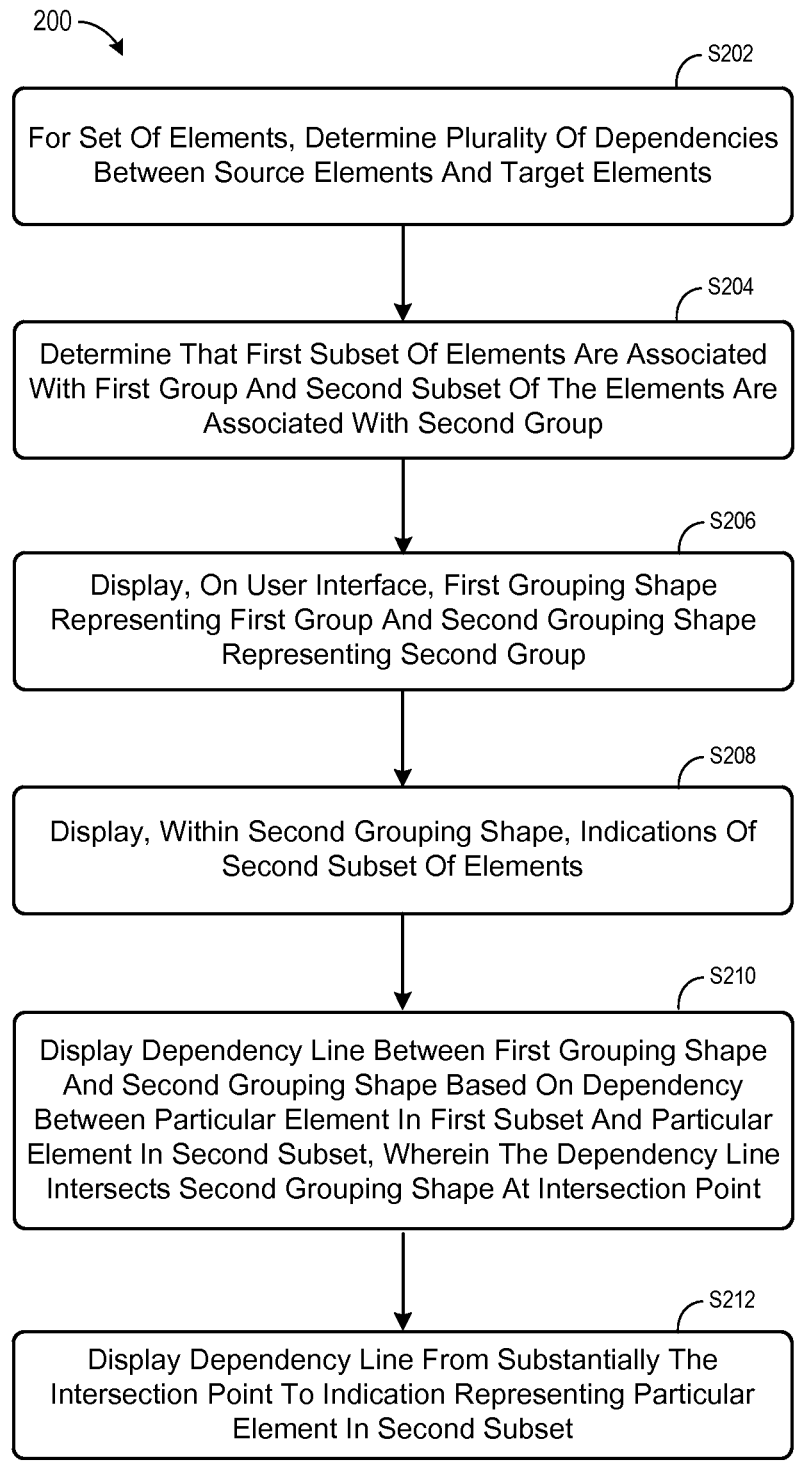
FIG. 2 is a flow diagram of a process in accordance with some embodiments.

To avoid such problems, some embodiments described herein provide systems and methods to automatically and efficiently visualize element, groups, and/or dependencies. In particular, FIG. 2 is a flow diagram of a process 200 in accordance with some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S202, for a set of elements, a plurality of dependencies between source elements and target elements may be determined. At S204, it may be determined that a first subset of elements are associated with a first group and that a second subset of the elements are associated with a second group. The determinations made at S202 and S204 may, for example, be performed by retrieve data from a text file or database.

Figure 3:
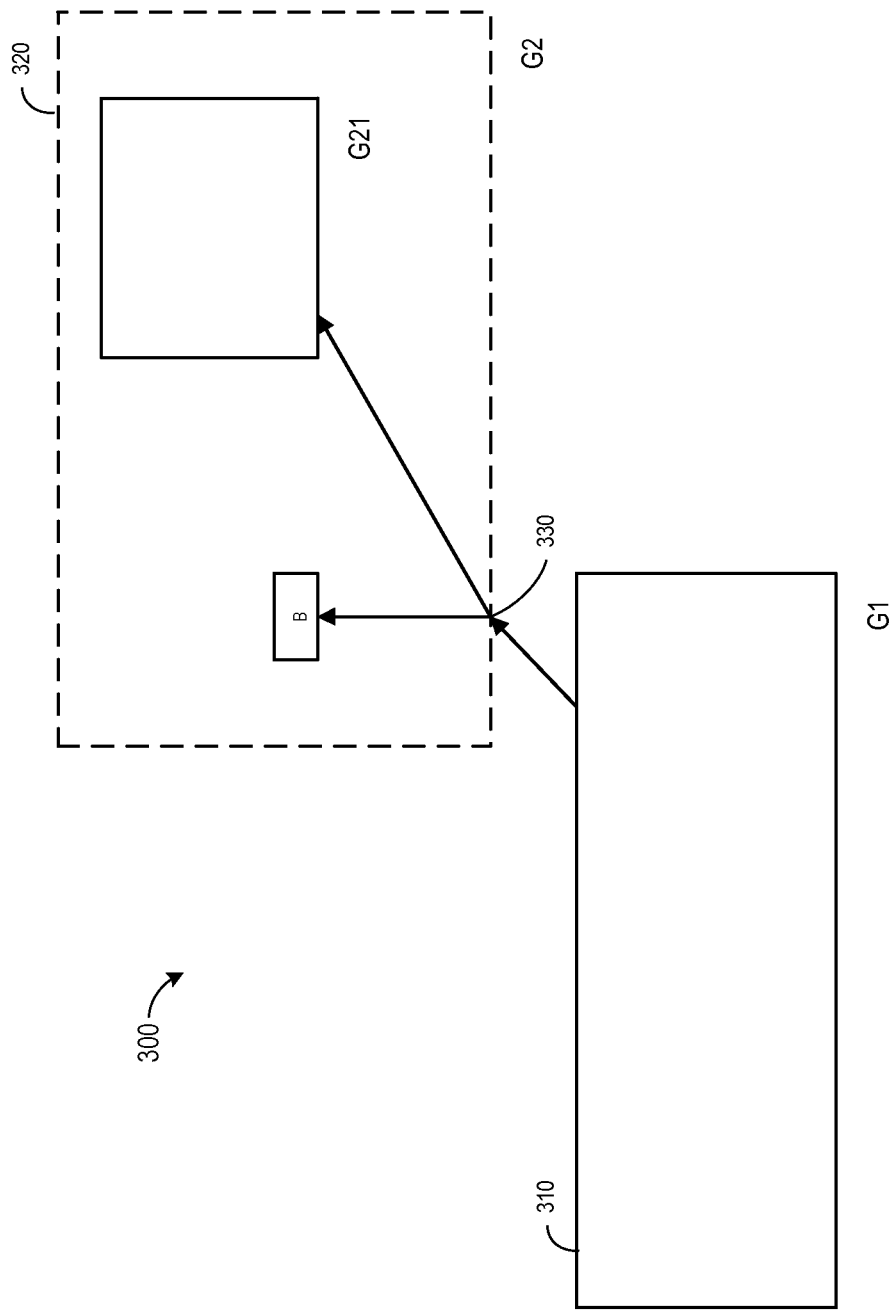
FIG. 3 is an illustration of a dependency graph display according to some embodiments.

At S206, a first grouping shape representing the first group and a second grouping shape representing the second group may be displayed. For example, consider FIG. 3 which provides an illustration of a dependency graph display 300 according to some embodiments. In this case, a first grouping rectangle 310 and a second grouping rectangle 320 are displayed. At S208, indications of the second subset of elements are displayed within the second grouping shape. Further note that other, nested, grouping shapes could also be displayed within the second grouping shapes. In the example of FIG. 3, elements B and group G21 are displayed within the second grouping rectangle 320.

At S210, a dependency line is displayed between the first grouping shape and the second grouping shape based on a dependency between a particular element in first subset and a particular element in the second subset, wherein the dependency line intersects the second grouping shape at an intersection point. In the example of FIG. 3, a dependency arrow is drawn from the first grouping rectangle 310 to the second grouping rectangle 320, intersecting at an intersection point 330.

At S212, another dependency line is displayed from substantially the intersection point (e.g., a point at or near the intersection point) to the indication representing the particular element in the second subset. In the example of FIG. 3, another dependency arrow is drawn from the intersection point 330 to element B. Note that the dependency line between the first grouping shape and the second grouping shape might, according to some embodiments, be associated with a plurality of elements in the second subset. In this case, a plurality of dependency lines may be drawn from the intersection point to each of the indications representing the plurality of elements in the second subset. In the example of FIG. 3, dependency arrows are displayed between the intersection point 330 and both element B and group G21.

According to some embodiments, a graph display platform may be associated with a Java based tool that visualizes and interactively modifies dependency structures within a hierarchical grouping of inter-dependent components or elements. The dependencies among the elements may also induce dependencies on higher grouping levels. The platform may be used, according to some embodiments, to analyze induced dependencies and/or to reorganize those dependencies by modifying the group assignments to align group dependencies with explicitly desired group relationships.

The platform may be used in connection with different types of components and/or different types of environments. Moreover, various nesting levels and/or dependency cycles may be supported. According to some embodiments, different orthogonal structures may be modeled onto the same elements simultaneously.

According to some embodiments, it may be possible to visualize different orthogonal groupings on the same element set simultaneously. For example, visualizations might be associated with functional coherence and/or development objects, packages, and/or component. As another example, visualizations might be associated with one or more technical classifications and/or development objects or types, such as a class a procedure, a database table, a dedicated type of script, a user manual, a reference manual, a scenario, a process, and/or an associated meta classification (e.g., indicating a native program code, data types, scripting information, and/or a document). As still other examples, visualizations might be associated with an organization of implementation projects, such as development objects, features, development projects, and/or releases (e.g., to help understand what has been touched for what feature) or a deliver line and with associated delivery objects, packages, and/or releases. Note that all of the groupings may be different and potentially handled at the same time with a single visualization.

Examples of elements that might be visualized in accordance with any of the embodiments described herein include atomic Development Component ("DCs") that carry dependencies. The DCs may, for example, be grouped into Software Components ("SCs"), which might, for example, be gathered by usage types. As another example, sources of C/C++ functions and classes or functional elements may be grouped by modules as compilation units. Multiple modules might again be grouped by areas represented by a folder hierarchy hosting the module sources.

Java classes may be organized by packages, and the dependencies among the Java classes may induce dependencies among packages. Note that the introduction of new class dependencies may lead to unexpected and/or undesirable cycles among Java packages. Similarly, projects and subprojects, such as Maven projects, may be associated with build projects having dependencies with nested build projects. In this case, it might be of interest which dependencies a group modules (described by a hosting project) may have.

As still another example, Advanced Business Application Programming ("ABAP") package structures and components might be associated with development objects with dependencies to other development objects. These might be organized by packages which may again be assigned to other components. Note that both structures may potentially be orthogonal to each other.

Some embodiments may be implemented using two orthogonal graphs. A first dependency graph may describe dependencies among basic elements, while a second grouping graph may describe how the elements of the dependency graph are grouped. The grouping graph may, for example, include nodes representing grouping elements and the nodes of the first graph as leaf elements.

The edges of the dependency graph may be totally independent of the edges of the grouping graph. Nevertheless, the dependencies among the nodes of the dependency graph may induce dependencies among the elements of the grouping graph. For example, consider a simple example a dependency graph with three nodes:

{A, B, C} and the edges

{C→A, C→B, B→A}.

The second graph, describing the grouping, may include three nodes:

{G1, G11, G3} plus the former node set together with the following edges:

{G1→G11, G11→A, G1→B, G2→C}.

Figure 4:
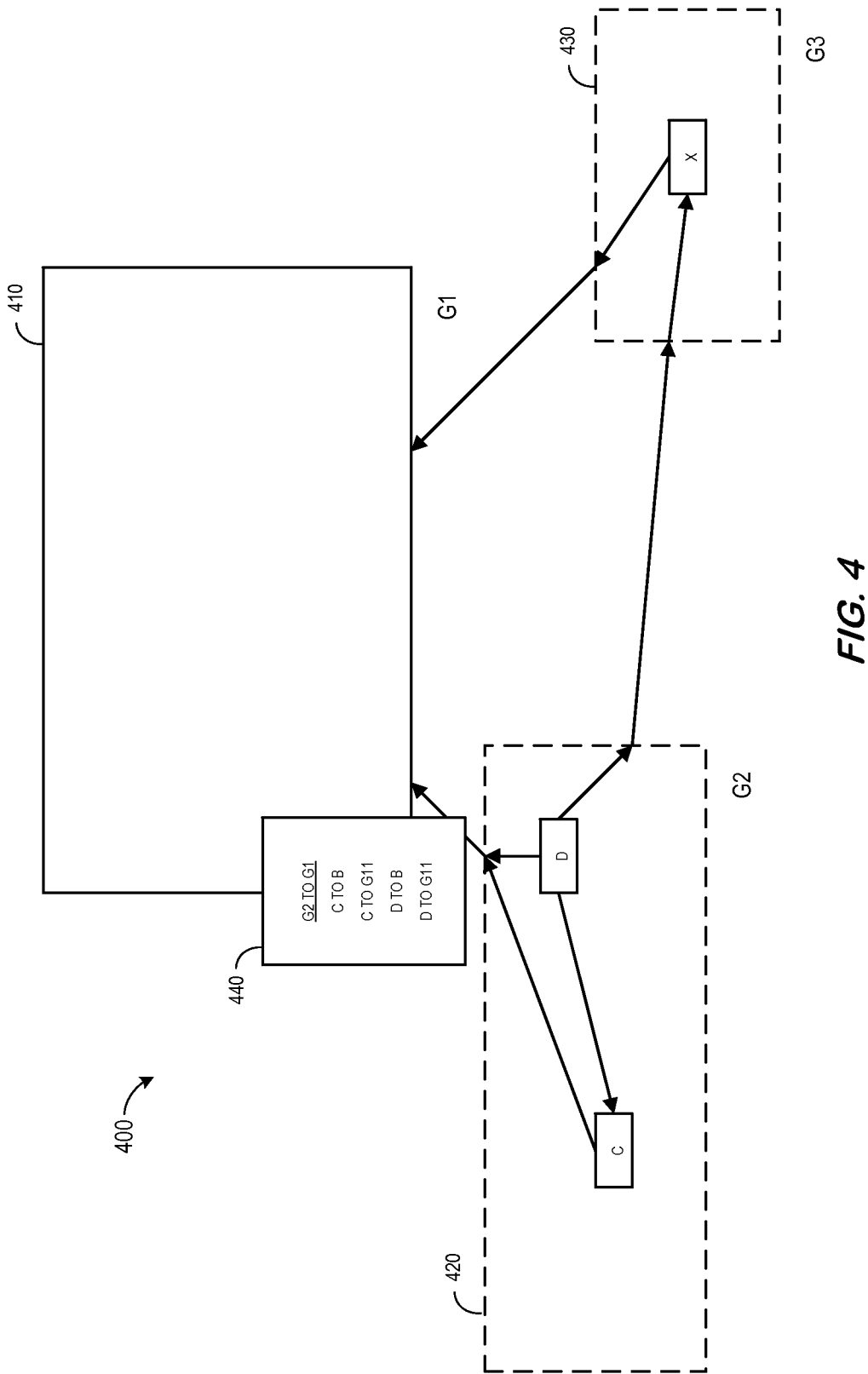
FIG. 4 is another illustration of a dependency graph display in accordance with some embodiments.
Figure 5:
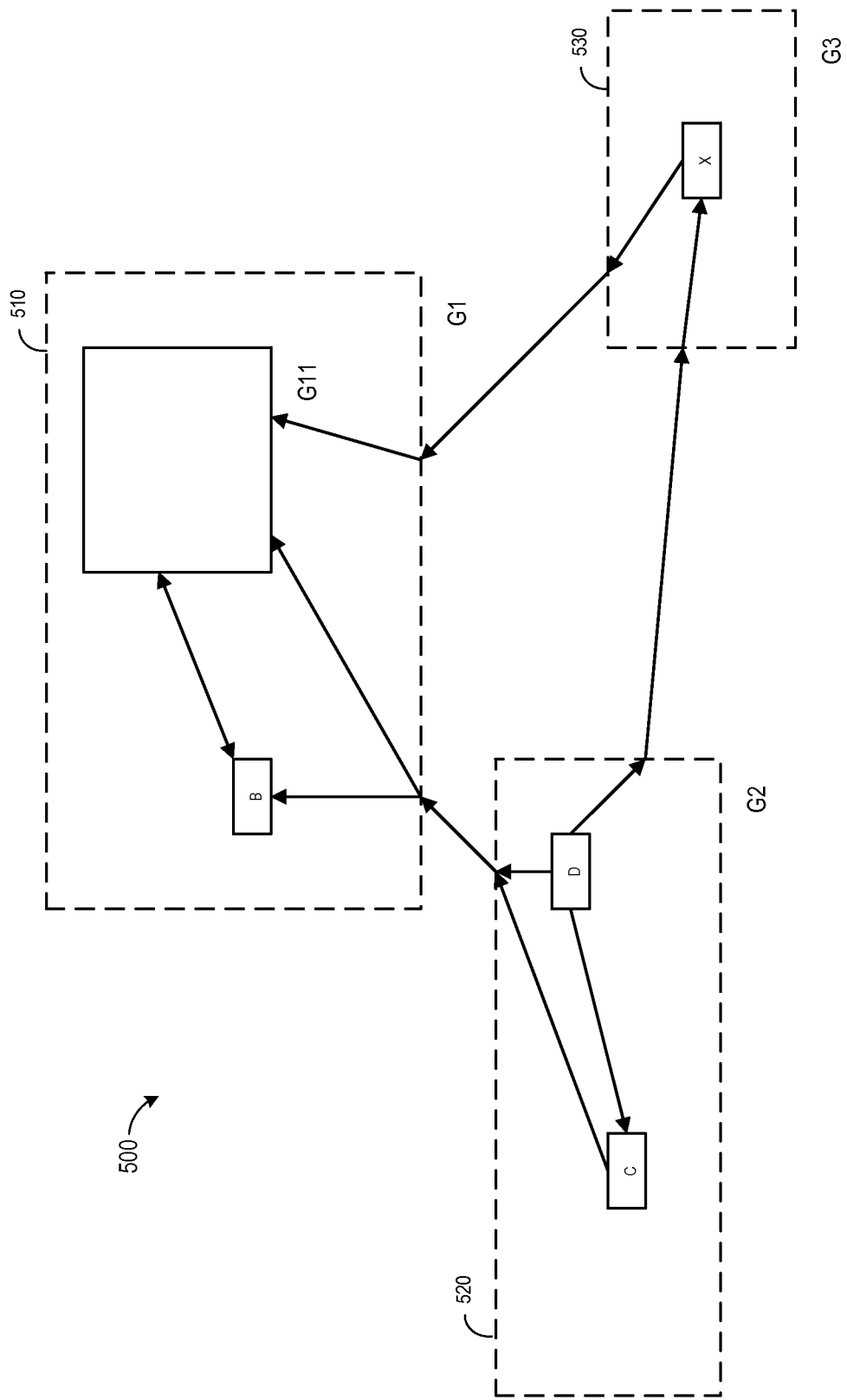
FIG. 5 is an illustration of a dependency graph display according to some embodiments.

This may represent a subset of the elements illustrated in FIGS. 4 and 5. The dependency graph induces dependencies among nodes of the grouping graph according to the combination of grouping relationships and the dependencies of the contained elements. A node Gx of the grouping graph is reachable from Gy according to the grouping graph.

In this example, the following dependencies among the node of the grouping graph may be induced:

{G2→G1, G2→G11, G1→G11, B→G11, C→G1, C→G11}

This model may be used to many different types of scenarios. According to some embodiments, the pair of graphs may be visualized by a graphing platform. Note that it might not be practical to display all elements of both graphs including all of the edges and induced edges.

According to some embodiments, four types of elements may be implemented in connection with the dependency graph display. "Atomic nodes" may carry dependencies to other atomic elements, and these dependencies may be the basis for inducing dependencies among structural elements. "Groups" may be used to model structural elements. While groups may not declare dependencies, note that they may include multiple atomic elements and/or other groups. "Basic dependency edges" may declare dependencies among atomic elements. Finally, "induced dependencies" may be automatically derived from the dependencies among the structured elements.

According to some embodiments, each node may be assigned a unique alphanumeric identifier indicating a name and a type. The type may be used, for example, to assign features to nodes (e.g., a node color) to help distinguish different kinds of elements.

According to some embodiments, a UI may show parts of the nodes of a grouping graph and visualize the grouping by placing contained elements inside a shape representing the surrounding node. That is, the grouping may be visualized by "nesting" the UI elements. For example, initially only a top level grouping nodes might be displayed. A user may drill down into the grouping graph by opening a grouping node. When a grouping node is opened, it may be enlarged and the content within it may be displayed. Moreover, a user may open and close grouping elements to explore the entire grouping graph. Note that a node might be shown more than once when drilling down several different grouping relationships. That is, because of inbound grouping edges, an element might be part of multiple (unrelated) groups.

According to some embodiments, induced edges are only displayed if they are within an opened grouping element. Thus, if multiple grouping elements follow a dedicated sequence of grouping relationships are shown, the outer levels show induced dependencies. Additionally, for all opened groups the connections among the contained nodes and the edges of the outer level may also be visualized by a dedicated form of edges. Those edges do not connect nodes, but instead connect nodes and edges of the next outer level.

For example, FIGS. 4 and 5 illustrate such a graph. Starting from a node all induced dependencies may be indirectly shown by following all possible paths along the connected edges. Note that not all induced edged are directly shown but are instead aggregated by edges for the higher grouping levels. This approach may, for example, simplify the overall visualization and allow a user to focus on areas of interest by opening certain groups while keeping others closed. Therefore, edges among non-atomic elements may represent a set of atomic relations and this may be used to examine the induced dependency graph.

According to some embodiments, a model may be described by a plain, line-based text file describing both graphs. The induced dependences may not need to be stored, because that information can be calculated as needed. The file may include a list of statements (e.g., one per line), each describing an element or feature and opening a context for subsequent statements. Accordingly, dedicated statements may be associated with a dedicated context.

```
<description>:: = { <comment> | <statement> | <empty line> }
<comment>::= '#' <any text> '\n'
<empty line>::= { <whitespace> } '\n'
```

Leading and trailing white space may be ignored for description element. A statement may contain a keyword followed by a colon and a comma separated argument.

```
<statement>:: = <identifier> ':' [<argument> {',' <argument>} ]
<identifier>::= <java rules for identifiers>
<argument>::= { char sequence without comma }
```

A node identifier may be represented by as just a pair of argument. The following illustrates some types of arguments that might be used according to some embodiments.

```
<nodeid>:: = <name> ':' <type>
<name>::= <argument>
<type>::= <argument>
<text>:: = <argument>
<width>::= <positive integer>
<height>::= <positive integer>
<x>:: = <positive integer>
<y>::= <positive integer>
<red>::= <integer 0-255>
<green>:: = < integer 0-255>
<blue>::= < integer 0-255>
```

According to some embodiments, structural statements may be provided to define a graph. Note that nodes may refer to other nodes by using the appropriate node identifier in an argument. According to some embodiments, a node may only refer to another node that has already been declared. Thus, forward declarations may represent a node declaration without follow-up statements related to the node context to declare features of the node. That is, it may only be possible to declare a node feature inside the last node declaration. Examples of structural statements include those illustrated in Table I.

TABLE I

Structural Statements

| Keyword | Arguments | Required Context | Opened Context | Description |
|---|---|---|---|---|
| Element | <nodeid> | none | element | Declare an atomic element. Without any context related follow-up statements it may be used as a forward declaration. |
| Dependency | <nodeid> | element | | Declare a dependency for the current element to the specified one. |
| Group | <nodeid> | none | group | Declare a group/structural element. Without any context related follow-up statements it may be used as a forward declaration. |
| Member | <nodeid> | group | link | Assign the specified element or group to the current group element. |

According to some embodiments, visualization attributions may be provided to define a graph display. Note that nodes and types may carry some attributes to be used for visualizations of the graph. Examples of visualization attributions include those illustrated in Table II.

TABLE II

Visualization Attributions

| Keyword | Arguments | Required Context | Opened Context | Description |
|---|---|---|---|---|
| Hints | | link/group/element | hints | Open the hint attribute section. |
| Size | <width>, <height> | hints | | specify the display size for opened groups |
| Location | <x>, <y> | hints | | Specify position for the element shown in an open group (relative center coordinates). |
| Hint (depreciated) | <x>, <y> | element/group/link | | Same as location. |
| NodeType | <typename> | none | nodetype | Start the type attribution. |
| Color | <red>, <green>, <blue> | nodetype | | Box color for group elements. |

According to some embodiments, other miscellaneous statements may be provided. Examples of miscellaneous statements include those illustrated in Table III.

TABLE III

Miscellaneous Statements

| Keyword | Arguments | Required Context | Opened Context | Description |
|---|---|---|---|---|
| Comment | <text> | none | | Written to stdout when reading the model. |
| Section | <text> | none | | Section name inside description name. This name is notified when reading the model. |
| RelationSet | <name> | none | relset | Start the declaration of a relationset. |
| Relation | <nodeid>, <nodeid> | relset | | Relation between two nodes. |

According to some embodiments, two types of UI elements may be provided: "boxes" (or "rectangles") and "arrows". Elements may be shown as smaller boxes and groups may be shown as larger boxes, and each may carry a label describing the name of the node. According to some embodiments, a user may select a box to drill down into the group represented by that box (e.g., by double clicking a mouse button). The grouping graph may, according to some embodiments, be visualized by the nesting of the involved UI elements. Opened groups may be shown as dashed boxes of variable size where might be adjusted by a user (e.g., by moving the borders of the box). The box may display all contained elements (which could include other groups that might be opened).

Arrows may illustrate dependencies (direct and indirect) and may point from the dependency source to the dependency target. According to some embodiments, three types of arrows may be provided:

1. Arrows associated with dependencies among nodes may point from box to box. In this case, there might not be a different style for element dependencies and induced dependencies among groups. All dependencies that can be resolved inside a group may be shown by this kind of arrow.

2. Arrows associated with output dependencies may occur when a dependency cannot be resolved within a group. In this case, the dependency leads to an induced dependency for the grouping element. Accordingly, this box may have an outgoing arrow. Note that all nested elements with locally unresolved dependencies may get an outgoing arrow pointing to the begin of the outgoing arrow of the group element used to resolve this dependency at the next higher grouping level (up the grouping graph).

3. Arrows associated with resolution of inbound dependencies may occur when an opened group is the target of an induced dependency. In this case, there may be inbound arrows pointing from the incoming arrow to the nested elements used to resolve the atomic incoming dependencies inducing the incoming dependency of the group.

Induced dependencies may bundle or aggregate multiple atomic dependencies between elements nested in the involved groups. This mechanism may simplify the visualization of the induced dependency graph without losing important information.

A user may manipulate the displayed boxes and arrows to analyze the dependency graph. For example, a user may drill down into the structure all the way to the level of an atomic element. FIG. 4 is another illustration of a dependency graph display 400 in accordance with some embodiments. In this example, groups G1, G2, and G3 are represented by grouping rectangles 410, 420, 430, respectively. The first grouping rectangle 410 is "closed" and does not display elements within it (represented by a solid line in FIG. 4) while the second grouping rectangle 420 is "opened" and does display elements within it (represented by a dotted line in FIG. 4). According to some embodiments, selection of the second grouping rectangle 420 by a user will cause indications group G2 elements to be alternately removed or displayed. For example, FIG. 5 is an illustration of a dependency graph display 500 according to some embodiments. As before, groups G1, G2, and G3 are represented by grouping rectangles 510, 520, 530, respectively but the first grouping rectangle 510 is now "open" and displays elements within it (element B and group G11).

At each level, the outgoing dependencies may be bundled together according to their target group or element. Note that this may only be possible when there is already some kind of structure expressed by grouping. That is, a flat set of elements would simply lead to a directly displaying all dependencies. According to some embodiments, a user may open or close a group by double clicking the left mouse button.

A user might also be able to move and/or re-order elements that are being displayed. When elements are moved, the associated arrows may be automatically updated. According to some embodiments, a user may perform this function by dragging a box (e.g., while holding down the left mouse button and shift key) or re-sizing a box by pulling a border of the box (e.g., while holding down the left mouse button).

A user might also be able to analyze dependency arrows. Note that each dependency arrow (e.g., the direct, inbound, and/or outbound arrows) there may be a tool tip showing the arrows ingoing or outgoing cardinality. The inbound cardinality may describe the number of elements appearing as sources for the dependencies bundled by the arrow. The outbound cardinality may describe the number of elements acting as targets. If an arrow points in both directions, the direction whose arrow head is nearer to the current mouse position may be chosen to display the tool tip.

According to some embodiments, a user can drill down further into the dependencies by display a dependency list associated with any particular arrow. For example, it may be possible to show the list of bundled atomic dependencies contributing to this induced dependency. That is, selection of a dependency line between a first grouping shape and a second grouping shape by a user might result in a display listing a number of dependencies. The display of FIG. 4 illustrates one example of such a listing box 440.

At a first level, a list of all target elements of the induced dependency may be provided (e.g., associated with the outbound cardinality). Here each element may be drilled down separately to the source elements carrying the dedicated dependency. According to some embodiments, a user may perform this function by a double click on an entry opens a secondary window for this target showing all source elements participating in the selected dependency arrow leading to the selected target element.

A user might also be able to highlight portions of the display. That is, for each element it may be possible to highlight all complete inbound and/or outbound paths by following the different kinds of dependency arrows up to the sources or targets. This may show all induced dependencies for a node to other nodes that are currently visible.

In addition to analyzing a dependency grapy, the UI may, according to some embodiments, let a user re-organize the actual relationships between and/or groupings of the elements. For example, a user might be able to change grouping information such as the nesting of various nodes. Instead of moving an element inside a grouping to change its location on the screen, a user might put the element into another grouping element just by dragging it one the other element (whether it is opened or closed). The link to the old grouping element may be removed and the element may be automatically placed into the target group. Note that it may be possible to assign a node to multiple groups. According to some embodiments, a user might perform this function by marking the element and linking the element to any other target group using a context menu. Whenever the structure is changed, the UI and induced dependencies may be updated as appropriate.

In some cases, a user might be able to introduce new groups and place them anywhere in the nested graph. According to some embodiments, a user might perform this function by selecting a "create group" option from a context menu. Similarly, a user might be able to delete nodes and/or unlink a node from a group. According to some embodiments, a user might perform this function using the context menu.

As another example, a user might be able to alter element attributes such as an element name or type. In some cases, a selection box might be displayed including all potential element types. As still another example, a user might be able to adjust relation set entries that describe a general relation among any source and target node. Note that any changes described herein might be logged into a log file that can subsequently be displayed to the user.

Figure 6:
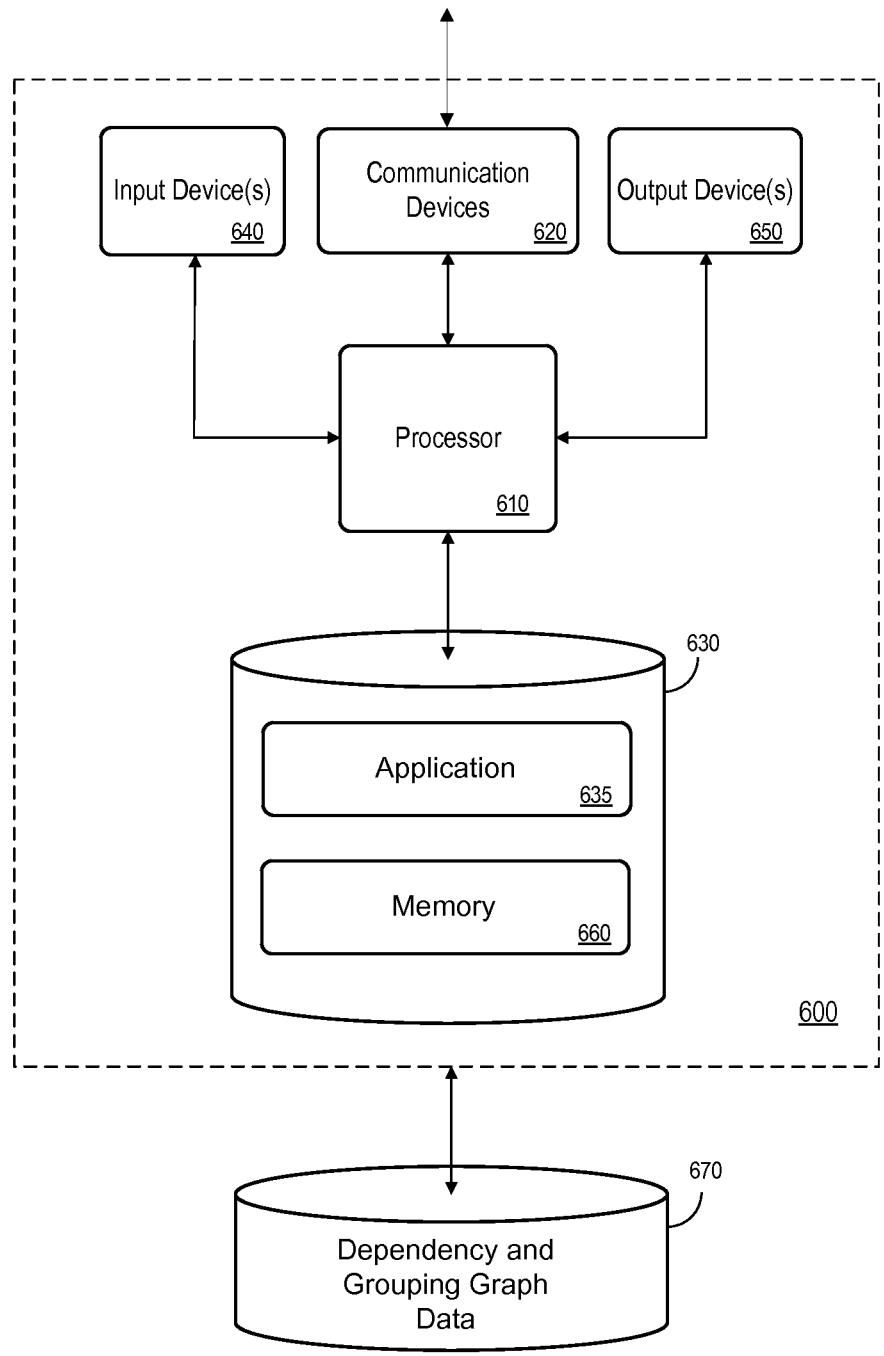
FIG. 6 is a block diagram of a system in accordance with some embodiments.

The processes described herein with respect to FIGS. 3 through 5 may be executed by any number of different hardware systems and arrangements. For example, FIG. 6 is a block diagram of a system 600, such as a system 600 associated with a dependency graph display platform in accordance with some embodiments. The system 600 may include a processor 610, such as one or more Central Processing Units ("CPUs"), coupled to communication devices 620 configured to communicate with remote devices (not shown in FIG. 6). The communication devices 620 may be used, for example, to exchange element information, grouping data, and/or dependencies with remote devices. The processor 610 is also in communication with an input device 640. The input device 640 may comprise, for example, a keyboard, computer mouse, and/or a computer media reader. Such an input device 640 may be used, for example, to receive dependency graph selections and/or adjustments from a user. The processor 610 is also in communication with an output device 650. The output device 650 may comprise, for example, a display screen or printer. Such an output device 650 may be used, for example, to provide a dependency graph display to a user.

The processor 610 is also in communication with a storage device 630. The storage device 630 may comprise any appropriate information storage device, including combinations of magnetic storage devices (e.g., hard disk drives), optical storage devices, and/or semiconductor memory 660. The storage devices may have different access patterns, such as Random Access Memory (RAM) devices, Read Only Memory (ROM) devices and combined RAM/ROM devices. The system 600 may be coupled to a dependency and grouping graph data storage device 670. The business object storage device 670 may, according to some embodiments, store non-transitory information about elements, groups, and/or dependencies.

As used herein, information may be "received" by or "transmitted" to, for example: (i) the system 600 from other devices; or (ii) a software application or module within the system 600 from another software application, module, or any other source.

The storage device 630 stores an application 635 for controlling the processor 610. The processor 610 performs instructions of the application 635, and thereby operates in accordance any embodiments of the present invention described herein. For example, the processor 610 may determine, for a set of elements, a plurality of dependencies between source elements and target elements. The processor 610 may also determine that a first subset of elements are associated with a first group and that a second subset of the elements are associated with a second group. A first grouping shape, representing the first group, may be displayed on a UI (e.g., associated with the output device 650) along with a second grouping shape representing the second group. Moreover, within the second grouping shape indications of the second subset of elements may be displayed. A dependency line may be displayed by the processor 610 between the first grouping shape and the second grouping shape based on a dependency between a particular element in first subset and a particular element in the second subset, and the dependency line may intersect the second grouping shape at an intersection point. A dependency line may also be displayed by the processor 610 from the intersection point to the indication representing the particular element in the second subset.

In this way, efficient systems and methods may be provided in connection with the display of elements, groups, and dependencies on a UI. Moreover, an intuitive visual impression of a complex dependency structure may be provided for the user. Thus, some embodiments implement a visualization and aggregation technique for visualizing induced dependencies together with the grouping relationships on a basic set of elements. Additionally, some embodiments provide modification techniques and how such modification may be handled on the UI level.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the data files described herein may be combined or stored in external systems). Moreover, although examples of specific types of elements, groups, and dependencies have been described, embodiments of the present invention could be used with other types of elements, groups, and dependencies.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method implemented by a computing system in response to execution of program code by a processor of the computing system, the method comprising:

for a set of elements comprising software development objects, determining a plurality of dependencies between source elements and target elements;

determining that a first subset of elements, grouped based on (i) usage type or (ii) areas represented by a folder hierarchy, are associated with a first group and that a second subset of the elements, grouped based on (i) usage type or (ii) areas represented by a folder hierarchy, are associated with a second group;

displaying, on a user interface, a first grouping shape representing the first group;

displaying a second grouping shape representing the second group, wherein the first and second grouping shapes comprise rectangles and the second group includes a nested third group associated with a third subset of elements;

displaying, within the second grouping shape, graphical representations of the second subset of elements and a rectangle representing the nested third group;

displaying a first dependency line between the first grouping shape and the second grouping shape based on a dependency between each particular element in first subset and each particular element in the second subset, wherein the dependency line intersects the second grouping shape at an intersection point, the intersection point comprising a point on a border of the second grouping shape;

displaying a second dependency line from the intersection point to the graphical representation representing the particular element in the second subset;

displaying a third dependency line from a particular element in the second subset to a second intersection point on a border of the rectangle representing the nested third group based on a dependency between the particular element in the second subset and a particular element in the third subset;

selecting, by the user, the grouping rectangle representing the nested third group; and in response to the user selecting the grouping rectangle representing the nested third group (i) displaying, on the user interface, within the rectangle representing the nested third group, graphical representations of a third subset of elements, (ii) a fourth grouping shape representing a fourth group associated with a fourth subset of elements and (iii) displaying a fourth dependency line from the second intersection point to the graphical representation of the particular element in the third subset.

2. The method of claim 1, further comprising:
automatically determining an induced dependency between elements based on the first group, the second group, and the defined dependencies.

3. The method of claim 1, wherein the elements and groups are respectively associated with at least one of: (i) development components and software components, (ii) sources of C/C++ functions and compilation units, (iii) Java classes and packages, (iv) build projects and modules, (v) advanced business application programming package structures and components, and (vi) electronic files and folders.

4. The method of claim 1, wherein the first dependency line between the first grouping shape and the second grouping shape is associated with a plurality of elements in the second subset, and further comprising:
displaying a plurality of dependency lines from the intersection point to each of the graphical representations representing the plurality of elements in the second subset.

5. The method of claim 4, wherein selection of the dependency line between the first grouping shape and the second grouping shape by a user results in a display listing the plurality of elements in the second subset.

6. The method of claim 1, wherein selections of the second grouping shape by a user causes the graphical representations of the second subset of elements to be alternately displayed or removed.

7. The method of claim 1, wherein the dependency line comprises a dependency arrow having an arrowhead reflecting a cardinality of an associated dependency between elements.

8. The method of claim 1, wherein a single element may be associated with both the first group and the second group.

9. The method of claim 1, further comprising:
receiving, from a user, an input associated with at least one of the displayed grouping rectangles or dependency lines; and
based on the received input from the user, automatically adjusting an induced dependency between elements based on the first group, the second group, and the defined dependencies.

10. The method of claim 1, wherein the software development objects comprise classes.

11. A non-transitory, computer-readable medium storing program code executable by a computer to perform a method, said method comprising:
for a set of elements comprising software development objects, determining a plurality of dependencies between source elements and target elements;

determining that a first subset of elements, grouped based on (i) usage type or (ii) areas represented by a folder hierarchy, are associated with a first group and that a second subset of the elements, grouped based on (i) usage type or (ii) areas represented by a folder hierarchy, are associated with a second group;

displaying, on a user interface, a first grouping rectangle representing the first group;

displaying a second grouping rectangle representing the second group wherein the second group includes a nested third group associated with a third subset of elements;

displaying, within the second grouping rectangle, graphical representations of the second subset of elements and a rectangle representing the nested third group;

displaying a first dependency arrow between the first grouping rectangle and the second grouping rectangle based on a dependency between each particular element in first subset and each particular element in the second subset, wherein the dependency arrow intersects the second grouping rectangle at an intersection point, the intersection point comprising a point on a border of the second grouping shape;

displaying a second dependency arrow from substantially the intersection point to the graphical representation representing the particular element in the second subset, wherein the first dependency arrow between the first grouping rectangle and the second grouping rectangle is associated with a plurality of elements in the second subset:

displaying a plurality of dependency arrows from the intersection point to each of the graphical representations representing the plurality of elements in the second subset;

displaying a third dependency arrow from a particular element in the second subset to a second intersection point on a border of the rectangle representing the nested third group based on a dependency between the particular element in the second subset and a particular element in the third subset;

selecting, by the user, the grouping rectangle representing the nested third group; and in response to the user selecting the rectangle representing the nested third group (i) displaying, on the user interface, within the rectangle representing the nested third group, graphical representations of a third subset of elements, (ii) a fourth rectangle representing a fourth group associated with a fourth subset of elements and (iii) displaying a fourth dependency arrow line from the second intersection point to the graphical representation of the particular element in the third subset.

12. The medium of claim 11, wherein the method further comprises:

automatically determining an induced dependency between elements based on the first group, the second group, and the defined dependencies.

13. The medium of claim 11, wherein the elements and groups are respectively associated with at least one of: (i) development components and software components, (ii) sources of C/C++ functions and compilation units, (iii) Java classes and packages, (iv) projects and modules, (v) advanced business application programming package structures and components, and (vi) electronic files and folders.

14. A system, comprising:

a processor;

a storage device, in communication with the processor, storing, for a set of elements, the elements comprising software development objects: (i) a plurality of dependencies between source elements and target elements, and (ii) an association of a first subset of elements with a first group, being grouped based on (i) usage type or (ii) areas represented by a folder hierarchy, and an association of a second subset of the elements with a second group, being grouped based on (i) usage type or (ii) areas represented by a folder hierarchy; and a dependency graph display platform, coupled to the storage device, wherein the graph display platform is to: (i) facilitate a display, on a user interface, of a first grouping shape representing the first group, (ii) facilitate a display of a second grouping shape representing the second group, wherein the first and second grouping shapes comprise rectangles and the second group includes a rectangle representing a nested third group associated with a third subset of elements, (iii) within the second grouping shape, facilitate a display of graphical representations of the second subset of elements, (iv) facilitate a display of a first dependency line between the first grouping shape and the second grouping shape based on a dependency between each particular element in first subset and each particular element in the second subset, wherein the dependency line intersects the second grouping shape at an intersection point, the intersection point comprising a point within a border of the second grouping shape, (v) facilitate a display of a second dependency line from substantially the intersection point to the indication graphical representation representing the particular element in the second subset, (vi) facilitate a display of a third dependency line from a particular element in the second subset to a second intersection point on a border of the rectangle representing the nested third group based on a dependency between the particular element in the second subset and a particular element in the third subset, (vii) select, by the user, the grouping rectangle representing the nested third group, and (viii) in response to the user selecting the grouping rectangle representing the nested third group (a) displaying, on the user interface, within the rectangle representing the nested third group, graphical representations of a third subset of elements, (b) a fourth grouping shape representing a fourth group associated with a fourth subset of elements and (c) displaying a fourth dependency line from the second intersection point to the graphical representation of the particular element in the third subset.

15. The system of claim 14, wherein the dependency graph display platform is further to automatically determine an induced dependency between elements based on the first group, the second group, and the defined dependencies.

16. The system of claim 14, wherein the elements and groups are respectively associated with at least one of: (i) development components and software components, (ii) sources of C/C++ functions and compilation units, (iii) Java classes and packages, (iv) projects and modules, (v) advanced business application programming package structures and components, and (vi) electronic files and folders.

17. The system of claim 14, wherein the second group includes a nested third group associated with a third subset of elements, and the dependency graph display platform is further to facilitate a display a third grouping rectangle within the second grouping rectangle.

18. The system of claim 14, wherein the dependency arrow between the first grouping rectangle and the second grouping rectangle is associated with a plurality of elements in the second subset, and the dependency graph display platform is further to facilitate a display of a plurality of dependency arrows from the intersection point to each of the graphical representations representing the plurality of elements in the second subset.

* * * * *